United States Patent [19]

Huttunen

[11] Patent Number: 5,448,622
[45] Date of Patent: Sep. 5, 1995

[54] CELLULAR TELEPHONE WITH PLURAL TELEPHONE NUMBERS

[75] Inventor: Heikki Huttunen, Salo, Finland

[73] Assignee: Nokia Mobile Phones Ltd., Finland

[21] Appl. No.: 337,130

[22] Filed: Nov. 10, 1994

Related U.S. Application Data

[63] Continuation of Ser. No. 151,569, Nov. 12, 1992, abandoned, which is a continuation of Ser. No. 905,748, Jun. 29, 1992, abandoned.

[30] Foreign Application Priority Data

Jul. 8, 1991 [FI] Finland ................... 913296

[51] Int. Cl.6 ........................... H04M 11/00
[52] U.S. Cl. ........................... 379/58; 379/59
[58] Field of Search ............ 379/58, 59, 60, 62; 455/33.1, 33.2; 340/825.47

[56] References Cited

U.S. PATENT DOCUMENTS

| | | | |
|---|---|---|---|
| 4,677,653 | 6/1987 | Weiner et al. | 379/58 |
| 4,734,928 | 3/1988 | Weiner et al. | |
| 4,742,560 | 5/1988 | Arai | 379/62 |
| 4,818,987 | 4/1989 | Ide et al. | 340/825.47 |
| 4,873,519 | 10/1989 | Matai et al. | 340/825.47 X |
| 5,020,091 | 5/1991 | Krolopp et al. | 379/58 |

FOREIGN PATENT DOCUMENTS

| | | |
|---|---|---|
| 0287061A2 | 10/1988 | European Pat. Off. . |
| 0344989A2 | 6/1989 | European Pat. Off. . |
| 0435052A2 | 10/1990 | European Pat. Off. . |
| 0435052A3 | 3/1991 | European Pat. Off. . |
| 2234833 | 2/1991 | United Kingdom . |

Primary Examiner—Curtis Kuntz
Assistant Examiner—G. J. Oehling
Attorney, Agent, or Firm—Perman & Green

[57] ABSTRACT

A cellular radio telephone (5) has two (or more) telephone numbers (TN1 ... TNN), specifically for example an office telephone number and a private telephone number. In one mode of operation both numbers are operable concurrently. However, in a second mode one of the numbers may be disabled by the user, e.g. using a menu selection facility on a visual display (55). In the first mode, the telephone number of an incoming call is shown on the display (55) so that the user can know which number the call is intended for before answering it. Preferably one of the telephone numbers may be selectively enabled for outgoing calls, again by menu selection. As a consequence all of the other telephone numbers may be automatically disabled for outgoing calls in both modes of operation.

5 Claims, 2 Drawing Sheets

CELLULAR TELEPHONE WITH PLURAL TELEPHONE NUMBERS

This is a continuation of application Ser. No. 08/151,569 (abandoned), filed Nov. 12, 1993 which is in turn a continuation of Ser. No. 07/905,748, filed Jun. 29, 1992, (abandoned).

The present invention relates to a cellular radio telephone having two or more telephone numbers.

The cellular system consists of mobile stations, a base station and mobile telecommunications switching office. Connections between various communication switching offices and between a switching office and a PSTN exchange is implemented along an ordinary telephone line.

In the mobile phone system, and automatic telephone exchange office is required to store the location of a mobile phone since it moves from one place to another. When a car with a mobile telephone is moving in a wide area, its location is automatically registered from the mobile phone into the automatic telephone exchange office.

A wide-area mobile telephone system covers a number of service areas, each of which usually has a mobile communication switching office. The current location of a mobile phone is stored in the home switching office as part of the subscriber's information. With any call into the mobile phone, a corresponding switching office accesses the home memory office and investigates the present position of the mobile phone being called.

U.S. Pat. No. 4,677,653 and U.S. Pat. No. 4,734,928 disclose an adapter for a cellular mobile telephone which converts the telephone to have any one of several different telephone numbers selected manually by the user. The adapter is provided with a plurality of number assignment modules (i.e. NAMs) in the form of respective ROMs, each storing a unique telephone number. The ROMs (or NAMs) are mounted on a main circuit board in a housing separate from the telephone unit. Each NAM is connected to a multi-position switch so that a selected one of the NAMs may be coupled to the microprocessor of the telephone to change the telephone number. These U.S. Patents essentially extend the concept of a cellular telephone having its own unique telephone number by teaching that each telephone may indeed be adapted to have several unique numbers, any one of which may be active (all the others being dormant) at any one time and the user would have a different billing account for each number.

In European Patent Application EP-A-0,378,450 it is disclosed that a single cellular telephone may contain several different telephone numbers. Also described therein is the transfer of a telephone number from a portable radio telephone to a mobile radio telephone which results in the mobile telephone simultaneously having two (or more) telephone numbers.

U.S. Pat. No. 4,742,560 discloses a mobile cellular telephone which has different telephone numbers for different service areas, stored in conjunction with a respective service area identification code.

According to the present invention there is provided a cellular radio telephone having plural telephone numbers, wherein in a first mode of operation all of said telephone numbers are concurrently enabled for incoming calls, and in a second mode of operation at least one of said telephone numbers may be selectively disabled for incoming or outgoing calls.

A cellular telephone in accordance with the present invention has the advantage that a subscriber may have two telephone numbers, e.g. an office number and a private number, in the same telephone, and these numbers may be selectively disabled so that either number alone is operable for incoming (or outgoing) calls or both numbers are simultaneously operable for incoming calls.

For outgoing calls it may be predetermined which one of the telephone numbers will be used. On the other hand, one of the telephone numbers may be selectively enabled for outgoing calls and consequently all of the other telephone numbers are automatically disabled for outgoing calls in both modes of operation. This gives the user the flexibility of chosing which telephone number to use for outgoing calls, and the choice of outgoing numbers can readily be changed.

In a preferred embodiment the telephone indicates on a visual display the telephone number which is being called (assuming this is one of the telephone numbers allocated to the telephone). Thus the user can see which number is being called before he elects to answer the call.

Suitably, the enabling and disabling of telephone numbers is accomplished by means of a menu selection facility shown on the visual display.

An embodiment of the invention will now be described, by way of example, with reference to the accompanying drawings, in which.

Figure 1:
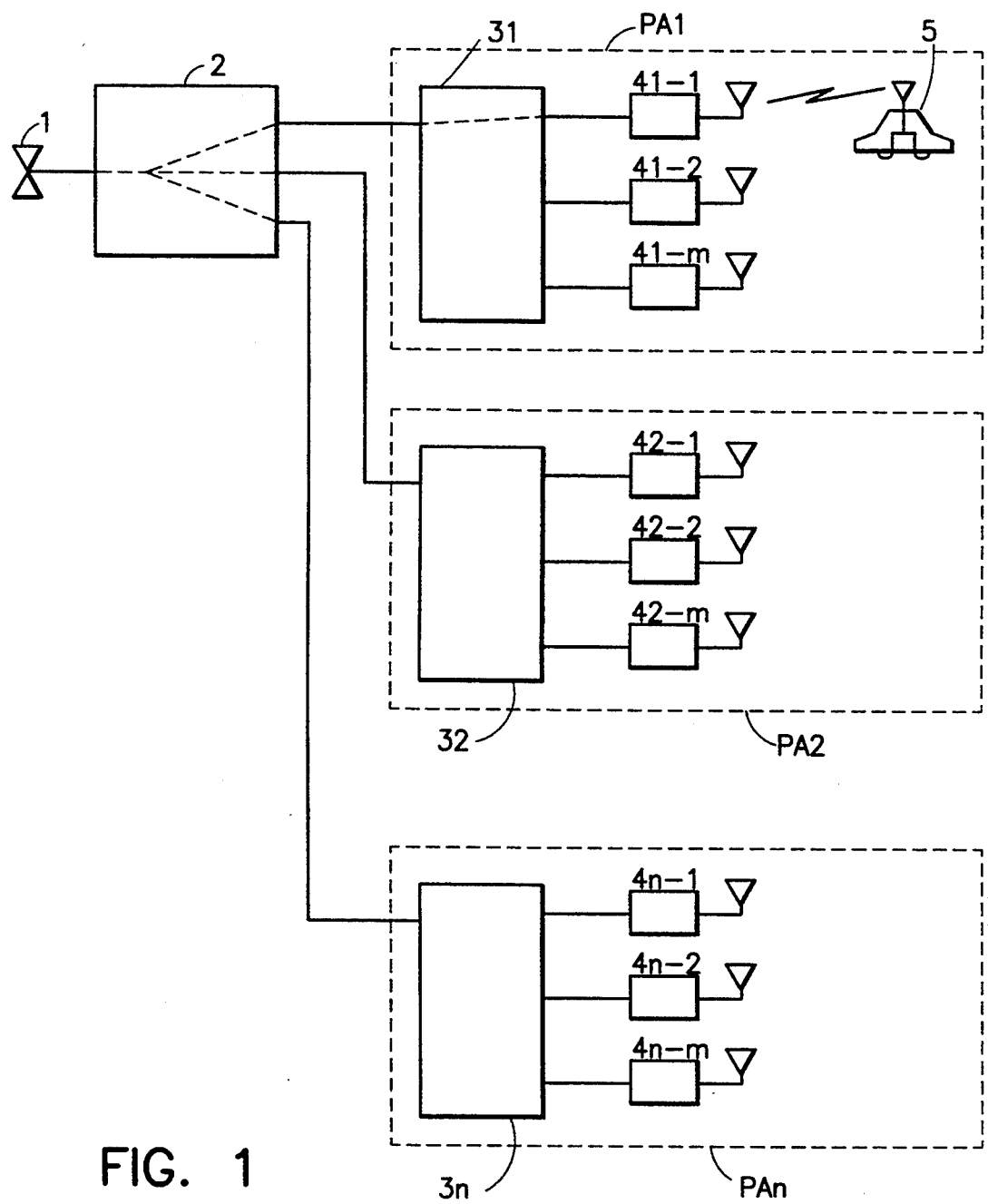
FIG. 1 is a schematic illustration of a cellular telephone system.

FIG. 1 illustrates an overall telephone system. A standard (land-line) telephone 1 makes a connection with the public switched telephone network (PSTN) 2. The PSTN 2 is in turn connected to a number of mobile telecommunication switching offices (MTSOs) $3l$–$3n$, which in turn are connected to a plurality of remote stations $4l$-1 . . . $4n$-m capable of communicating with a mobile telephone 5. Also shown in FIG. 1 are the different service areas PA1 . . . PAn associated with respective MTSOs $3l$ . . . $3n$.

Figure 2:
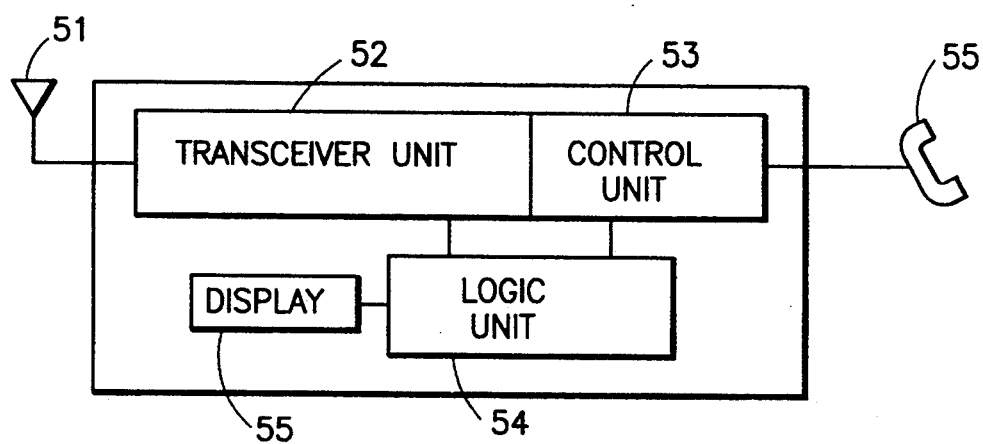
FIG. 2 is a block diagram showing the main functional parts of a cellular telephone in accordance with the invention.

FIG. 2 illustrates the functional portion of a mobile telephone 5 in accordance with the invention. The telephone 5 includes a transceiver 52 coupled to an antenna 51 for receiving and transmitting radio frequency signals. The telephone 5 includes a handset 55 comprising a keypad, a microphone, and an earpiece. A control unit 53 in the telephone 5 controls the channel selection in the conventional manner and a logic unit 54, comprising a microprocessor 541 (see FIG. 3), controls the general operation of the telephone. A visual display 55, e.g. a liquid crystal display, itself well-known to a person skilled in the art is under the control of the microprocessor 541 of the logic unit 54.

Figure 3:
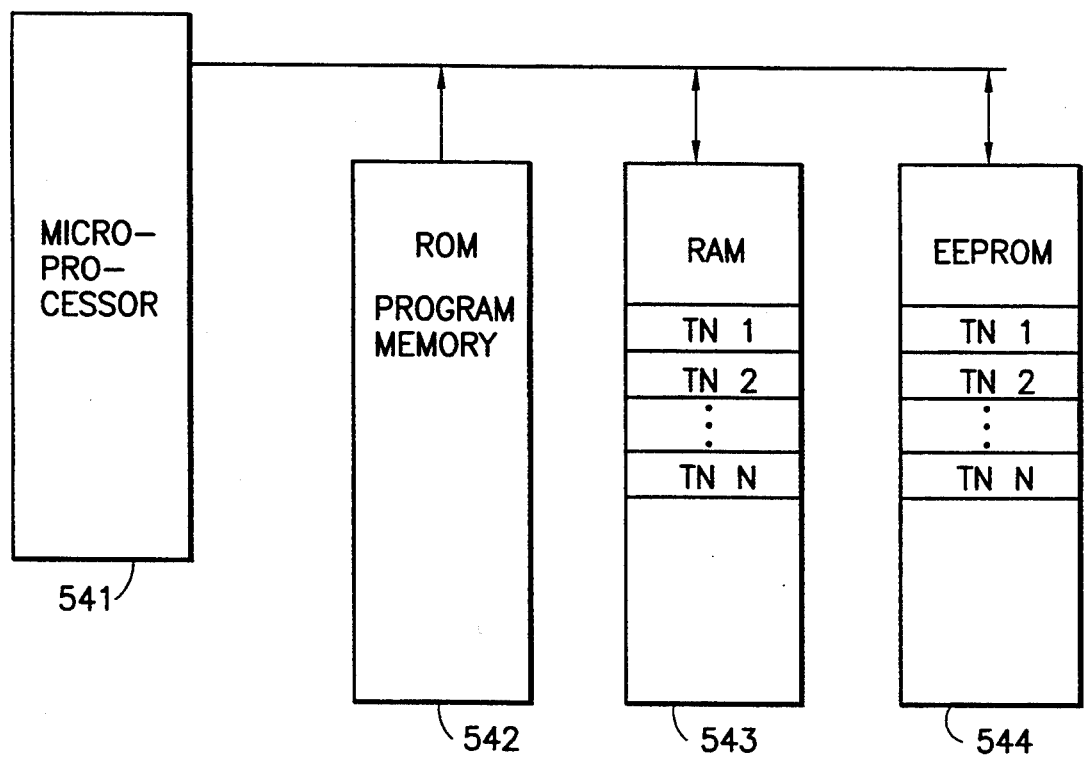
FIG. 3 is a block diagram showing in more detail part of the telephone in FIG. 2.

In accordance with the invention the cellular telephone is provided with two or more distinct telephone numbers TN1 . . . TNN. For example one telephone number may be the subscriber's private number, whereas another telephone number may be that of the user's employer, i.e. his "office" number. The telephone numbers TN1 . . . TNN are stored in an EEPROM 544. A copy of the telephone numbers stored in the EEPROM 544 may also be transferred to a RAM 543, as shown in FIG. 3. All the telephone numbers TN1 . . . TNN stored in the telephone are registered together with the location of the telephone in the home MTSO in the usual way. When an incoming call is made, the microprocessor 541 compares the telephone number which is being paged (i.e. the telephone number for which the incoming call is intended) with all of the numbers TN1 . . . TNN stored in the EEPROM 544. Alternatively the comparison may be made directly with the telephone numbers TN1 . . . TNN stored temporarily in the RAM 543. If a match is found, the number being paged is displayed on the visual display 55 under the control of microprocessor 55. Thus the user has the benefit of seeing the number which is being called before he decides to answer the incoming call. The call may then be answered in the conventional way e.g. by pressing a key on the handset keypad. The call will then proceed in the usual way.

One of the keys on the handset keypad includes a menu or function key, suitably labeled. Depression of this key permits a variety of pre-set menus, the related instructions of which are stored in read only memory (ROM) 542, to be viewed on display 55 and selectively enabled. The various menus may be selected for example by pressing appropriate keys on the keypad after pressing the menu key. The relevant menu is shown to the user in words or abbreviations on the display 55. For example, it is known that the user may be able to select the ring tone by appropriate menu selection. More sophisticated options may also be available via the menu facility. For example, particularly in the context of a hand-held (portable) cellular telephone, the user may be able to selectively enable the so-called Discontinuous Transmission Mode which employs a voice activated switch which helps to reduce battery drain by transmitting only when speech is input to the microphone.

In accordance with the present invention a special menu facility is provided to permit manual selection of preferred telephone numbers for incoming calls. Any predetermined sequence of keystrokes may be employed to select the respective menu which may display a legend such as "TEL NUMBERS IN" on the display 55. Pressing another key will cause the telephone numbers TN1 . . . TNN stored in the RAM 543 (or EEPROM 544) to be scrolled on the display 55. As each telephone number is displayed the user has the option to toggle the number on or off (i.e. enable or disable the number displayed) by pressing another particular key, e.g. the menu or function key. If a particular telephone number TNX is disabled the telephone 5 will not respond to an incoming telephone call intended for that number, and so will not display the number of the display 55. The telephone number TNX may of course be re-enabled quite simply using the menu routine described here.

Similarly the telephone numbers TN1–TNN may be independently selectively enabled for outgoing calls through the menu-selection facility. In this case whenever a particular telephone number TNY is enabled for outgoing calls, all of the other telephone numbers are automatically disabled, but only for outgoing calls since the telephone preferably makes outgoing calls on one prioritized number only. Again the prioritized number for outgoing calls may readily be changed by the user by means of the menu-selection routine described here.

The outgoing call priority selection may be entirely independent of the selective enablement of numbers for incoming calls. Alternatively it may be arranged that whenever a telephone number is disabled for incoming calls it is also automatically disabled for outgoing calls. Thus, in the case of a telephone having two telephone number (e.g. an office number and a private number), it is very straightforward to change between a mode in which telephone is capable of (a) making and receiving calls on both telephone numbers, (b) making and receiving calls on the office number but not the private number, and (c) making and receiving calls on the private number nut not the office number.

In the case of a telephone having more than two telephone numbers, the telephone may of course be arranged to respond selectively to different groups of numbers for incoming and/or outgoing calls, again using the menu-selection facility described herein.

In view of the foregoing description it will be evident to a person skilled in the art that various modifications may be made within the scope of the invention.

I claim:

1. A cellular radio telephone having plural telephone numbers, comprising:
    storage means for storing a plurality of telephone numbers associated with said cellular radio telephone; and
    user interface means coupled to said storage means and responsive to a first input from a user, for displaying each one of said plural telephone numbers, said user interface means further responsive to a second input from the user, for selectively and concurrently enabling plural individual ones of said stored telephone numbers to enable said telephone to respond to incoming calls on any of said plural telephone numbers that are selected and for independently, and concurrent with an enablement of said plural individual ones of said stored telephone numbers for incoming calls, enabling any one of said stored telephone numbers for use for outgoing calls.

2. The cellular radio telephone as recited in claim 1, wherein said user interface means displays in a scrolling manner, said plurality of telephone numbers and renders a said displayed telephone number responsive to said second input.

3. A cellular radio telephone as recited in claim 1, wherein one of said telephone numbers is selectively enabled by said second input for outgoing calls, whereupon all of the other telephone numbers are automatically disabled for outgoing calls.

4. A cellular radio telephone as recited in claim 2, further comprising:
    means for identifying an incoming call intended for any of said plurality of telephone numbers enabled to receive incoming telephone calls; and
    means responsive to said identifying means for displaying on the visual display the telephone number for which the incoming call is intended.

5. A cellular radio telephone as recited in claim 2 wherein means are provided for selecting an appropriate one of a set of predetermined operating instructions stored in memory and indicated on said user interface means, whereby said at least one telephone number is selectively disabled for incoming calls.

* * * * *